Sept. 30, 1958          W. R. GRAY          2,854,116

VENDING MACHINE

Filed Jan. 2, 1953          6 Sheets—Sheet 1

INVENTOR.
WALTER R. GRAY
BY Forrest J. Hilly
Attorney

Sept. 30, 1958 W. R. GRAY 2,854,116
VENDING MACHINE
Filed Jan. 2, 1953 6 Sheets-Sheet 2

INVENTOR.
WALTER R. GRAY
BY
Attorney

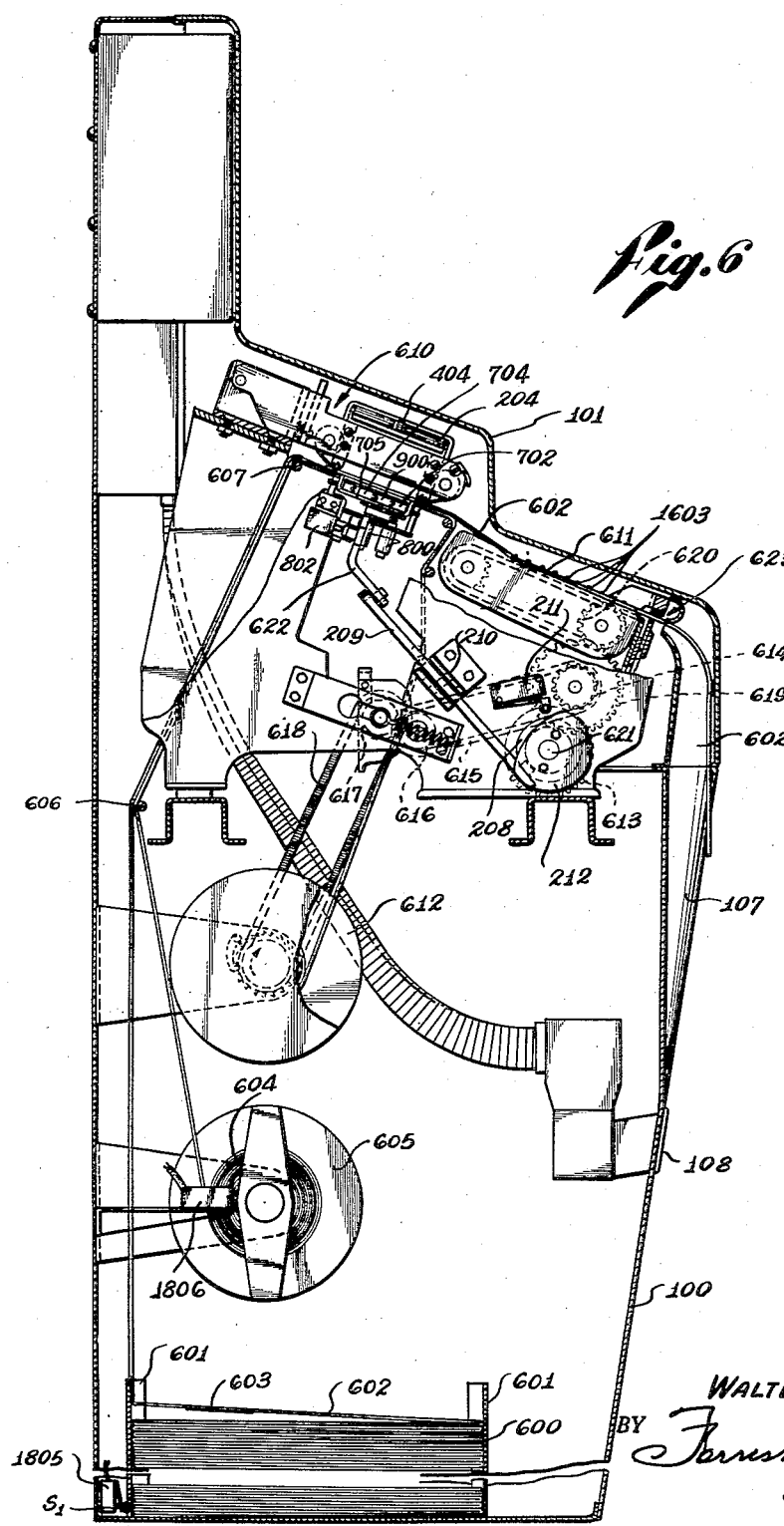

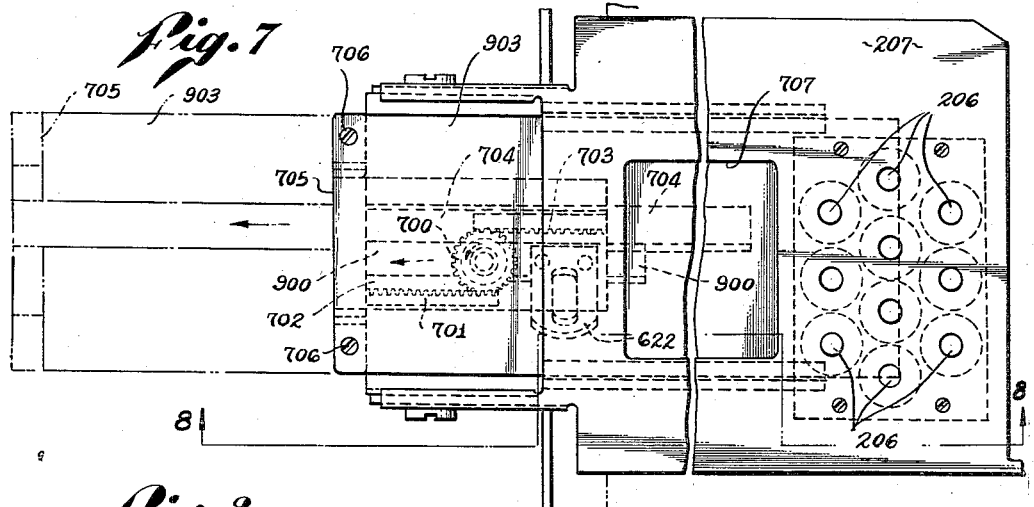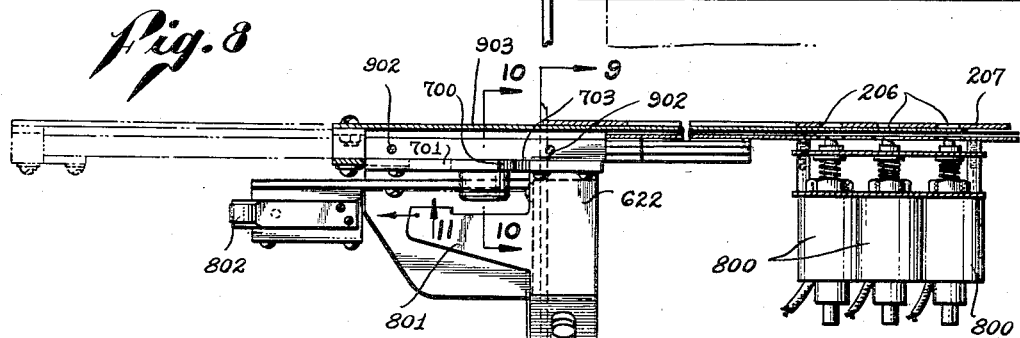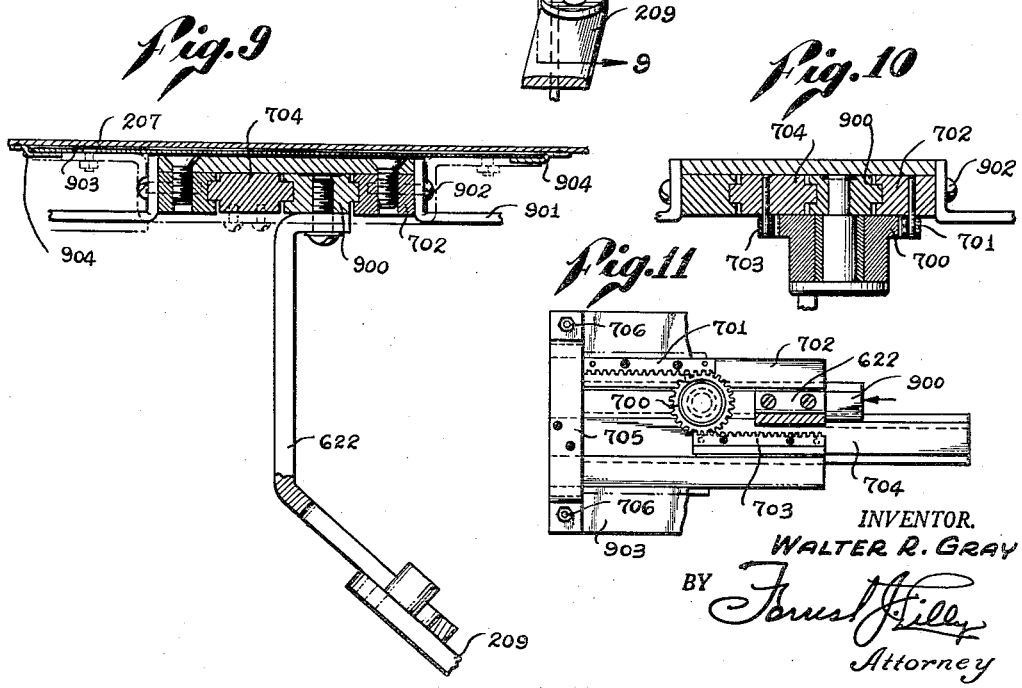

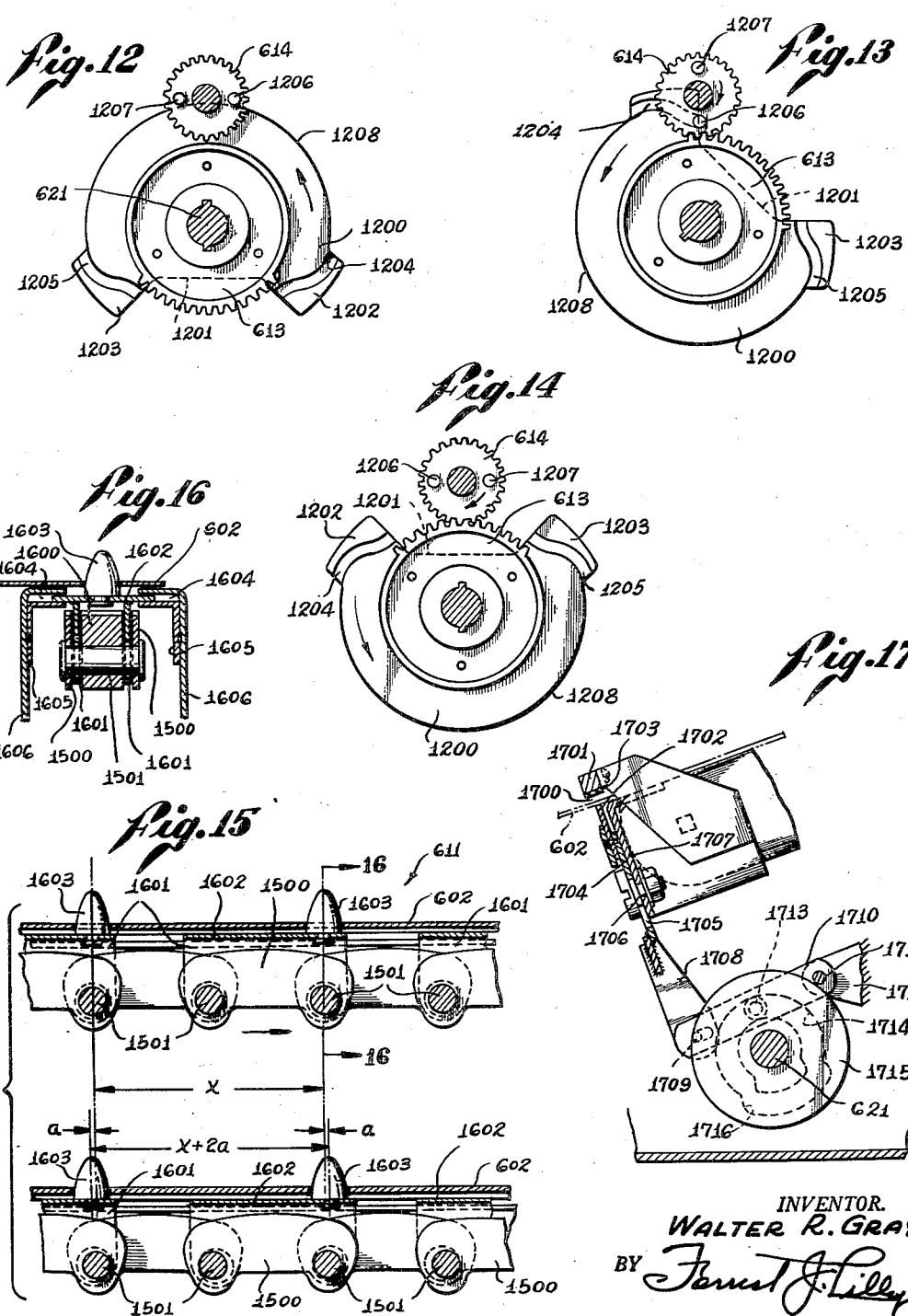

Sept. 30, 1958        W. R. GRAY        2,854,116

VENDING MACHINE

Filed Jan. 2, 1953        6 Sheets-Sheet 6

Fig. 18

INVENTOR.
WALTER R. GRAY
BY
Attorney

United States Patent Office 2,854,116
Patented Sept. 30, 1958

2,854,116

VENDING MACHINE

Walter R. Gray, Redondo Beach, Calif., assignor, by mesne assignments, to Mercury International Research Company, Walteria, Calif., a corporation of California Application January 2, 1953, Serial No. 329,180

12 Claims. (Cl. 194—10)

This invention relates to vending machines and more particularly to a coin actuated insurance policy vending machine capable of receiving one to several coins for issuing insurance policies of different amounts.

The usual coin operated insurance vending machines such as those used for issuing accidental insurance policies to airline passengers for example, generally include means for receiving up to five coins to provide insurance policies ranging in amounts from $5,000 to $25,000 in increments of $5,000. These machines will also print or otherwise indicate the amount of the policy on the original form issued to the customer in response to the number of coins deposited, such designation also being reproduced on duplicates by means of carbon backing on the original forms. Also printed on the original and reproduced on the duplicate at the time of the purchase are the date and time the policy is being issued. The original and duplicate forms are provided with printed serial numbers before they are loaded in the machine. The duplicate forms are of the same general dimensions as the original forms and are folded together with the originals in one stack in the machine, and fed through the machine by means of a sprocket wheel drive, all as is well known in the art.

These machines also include a window cover mechanism which will open as soon as a coin is deposited to permit the customer to fill in the necessary information on the original form, this information being reproduced on the duplicate underneath. A single button or switch control is provided which when operated by the customer after he has filled in the required data will cause the printing of the date, time and amount of the policy to be effected. This button will also close the window cover mechanism and actuate the sprocket wheel drive to deliver the policy, a cutting knife within the machine severing the original policy from the stack so that it drops in a basket or other receptacle where the customer may retrieve it. The duplicate forms may or may not be cut but in any event are retained and restacked in the machine.

In order to keep the size and complexity of these prior art machines within reasonable limits, the possible number of different insurance amounts and thus the number of coins to be accommodated by the machine is generally limited. Further, the indicating means for designating on the policy the number of coins inserted and thus the amount of the policy does not always positively mark the duplicate. In this connection, utilizing a mark or print to serve as the indication, necessitates auditing of the various policies to be accomplished by trained personnel and is, accordingly, extremely time consuming.

Another problem has involved the bulk of and the space occupied by the duplicate policies in view of the fact that they are of substantially the same dimensions as the original. Moreover, there has not been provided in the past a means for efficiently monitoring the original or duplicate policies, resulting in the loss of coins inserted after the supply to the machine has been exhausted.

There has also been the possibility of the serial numbers on the originals not matching up with the serial numbers on the duplicates due to improper loading of the machine.

In these previous machines, the window cover mechanism exposing the policy for the customer to fill in the required information has been such that the policy might be removed or otherwise tampered with through such opening by unauthorized persons.

Still another difficulty has been encounted in the sprocket driving wheel. These feeding means usually consist of a series of teeth solidly secured on a wheel which engage corresponding sprocket holes along the two longitudinal edges of the original and duplicate policies to pull them from a stacked position in the machine through the data printing mechanism and out to the customer. Under different climatic conditions the distance between sprocket holes in the policies are liable to change due to shrinkage of the paper. This action would oftentimes cause the sprocket holes to tear and the feeding mechanism to jam. Moreover, if any of the sprocket holes happened to be initially damaged or torn, the feed sprocket wheel would not function to feed the policy. One of the more serious complaints of present machines involves just such paper jamming. Another complaint on present machines is that occasionally a customer through ignorance or haste will push the policy delivery button immediately after depositing the desired number of coins, without first filling in the required information on the policy through the exposed area. A policy thus delivered is void even if filled out later, since no duplicate information is retained in the machine. This can be a very serious situation if the customer thinks he is adequately covered whereas actually the insurance company has no record of the policy.

Finally, on delivery of the policy a complete severing has been effected by means of a cutting knife. This has resulted in the completed policy falling on the floor if the customer is not vigilant in grasping the same as it is issued; or, in the event one customer is purchasing several policies and there is provided receptacle means, the receptacle was liable to be filled with such policies and thereby block others from issuing from the machine and thereby causing a paper jam if the prior pile were not first removed by the customer.

It is a primary object of the present invention to provide a machine capable of accommodating from one to ten coins and accordingly issuing policies up to ten different amounts.

Another object is to provide a mechanism for indicating the number of coins deposited and positively marking the original and duplicate forms in a manner such that the duplicate forms may be audited by mechanical or electronic means.

Still another object is to provide a printing mechanism whereby the serial number is printed on the original and duplicate at the time the policy is in the process of being obtained thus avoiding mismatching of the serial number on the original and the duplicate.

A further object is to provide a novel means for supplying duplicate information without having to utilize a bulky supply of duplicate policies of the same dimensions as the originals.

Another object is to include means for indicating the number of policies issued and for monitoring the original and duplicate policy supply whereby the machine is automatically rendered inoperative when either such supplies are depleted, and further inserted coins will be returned to the customer.

Another object is to provide an improved window cover mechanism for exposing the original policy, but which is so designed as to prevent substantially any tampering with the policy through the window.

Yet another object is to provide a new type of sprocket drive means which is more positive in action, will not jam due to paper shrinkage, and which will function even though some of the sprocket holes in the policies may be damaged. An auxiliary object in this connection is to provide a novel variable speed cam mechanism for actuating the sprocket drive.

Another object is to eliminate the possibility of a customer receiving a policy until it has been filled out in the machine, thereby preventing the issuance of void policies.

Still another object is to provide a novel delivery means permitting the issued policy to be conveniently detached by the operator.

These and further objects and advantages of the present invention are attained by a novel combination of electrical and mechanical parts and movements which will now be described with reference to the accompanying drawings in which:

Fig. 6 is a side view partially in section of the complete machine as seen looking in the direction of the arrows 6—6 in Fig. 1;

Fig. 7 is a plan view of the window cover mechanism as seen looking in the direction of the arrows 7—7 in Fig. 2;

Fig. 8 is a front view of the apparatus of Fig. 7 looking in the direction of the arrows 8—8;

Fig. 9 is a cross-sectional view as seen looking in the direction of the arrows 9—9 of Fig. 8;

Fig. 10 is another cross-sectional view looking in the direction of the arrows 10—10 of Fig. 8;

Fig. 11 is a bottom view of the slide mechanism shown in Fig. 7;

Figs. 12, 13 and 14 illustrate respectively in three operating positions, a variable speed cam mechanism;

Fig. 15 illustrates in two elevational views the novel sprocket chain employed in the invention;

Fig. 16 is a detailed view of one of the sprockets as seen looking in the direction of the arrows 16—16 in Fig. 15;

Fig. 17 is a side view partially in section of the delivery mechanism of the invention; and Fig. 18 shows the electrical circuit.

Figure 1:
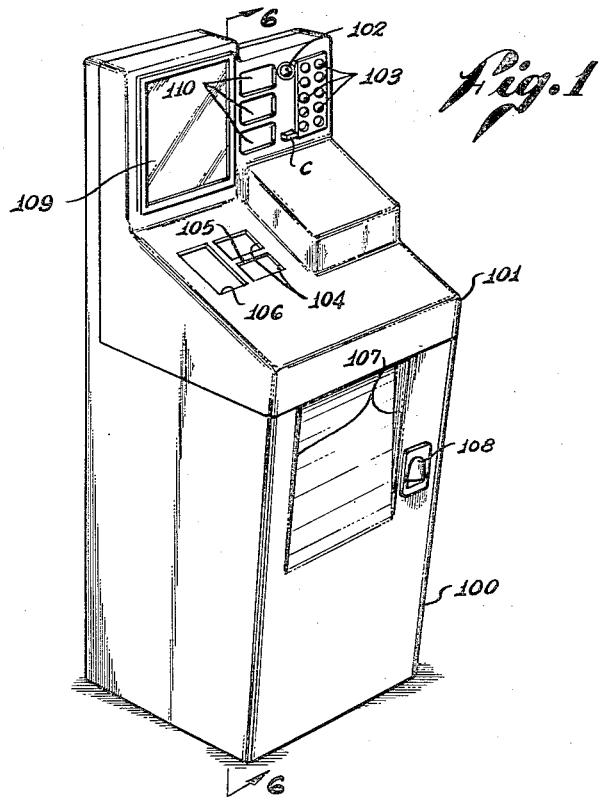
Fig. 1 is a perspective view of a preferred embodiment of the invention.

For convenience and clarity, the description of the apparatus will be divided into six major topics as follows:

I. Printing and marking mechanism (Fig. 2 to 5);
II. Duplicating mechanism (Fig. 6);
III. Window cover mechanism (Fig. 7 to 11);
IV. Sprocket drive mechanism (Fig. 12 to 16);
V. Delivery mechanism (Fig. 17);
VI. The electrical circuit (Fig. 18).

Reference may be had to figures pertaining mainly to different topics when discussing one topic, in the event certain features are more clearly illustrated therein. Like reference numerals throughout the various figures are used to designate like parts.

The preferred form of the invention is embodied in an insurance policy vending machine of the type used in airline terminals for delivering accident insurance policies to airline passengers. While the present description will relate to this particular type of machine, it is to be understood that the principles of the invention are applicable to any type of coin operated form issuing vending machine.

Referring to Fig. 1, the machine is shown as comprising a lower frame casing 100 sloping upwardly at the front to merge with an upper casing 101 which may be removed only by authorized agents from lower casing 100 to expose the working mechanism.

Upper casing 101 includes a coin slot opening 102, and a series of ten lights 103 which will successively light each time a coin is deposited in slot opening 102, thus indicating to the customer the number of coins deposited. A manually operable control button C is provided below the coin slot opening as shown. Also provided is an application window opening 104 divided by a transverse bar 105, adjacent "fill-in" instructions exposed and illuminated in a window 106 when the application opening window cover mechanism is open.

Lower casing 100 includes a depressed area 107 where the original of the insurance policy is delivered, and also a coin return box 108 to which coins will be returned if the machine is out of order, the policies within the machine exhausted, or more than 10 coins are inserted for any one purchase.

A large screen 109 in the upper casing 101 may be provided, if desired, for displaying advertising material.

In operating the machine, three steps are to be followed. These steps are outlined in the form of written instructions displayed by suitable lights respectively in three windows 110. First, one or more coins are deposited in the coin slot opening 102, depending on the amount of insurance desired. The first inserted coin closes a circuit to operate a cover mechanism exposing a portion of the application through the window 104. Second, the customer fills in the application according to the printed instructions displayed in window 106. Third, the customer presses control button C which actuates suitable mechanism for delivering the policy to the customer in the area 107. In the event the machine is out of order, the lights illuminating the instructions do not work and an out-of-order light located behind the coin slot opening 102 but visible through such opening, is caused to turn on.

*Printing and marking mechanism*

When a first coin is inserted in coin slot opening 102, a printing and marking mechanism is actuated. This system simultaneously prints the agency number, the date and time the policy is being issued, and the machine number, in the position order given, the serial number of the policy comprising these indications. A validating signature stamp is also actuated as well as a marking device in the form of solenoid operated perforators for punching a number of holes in the policy to indicate the number of coins inserted, one such perforator being operated in response to the first coin.

To understand this mechanism, reference will first be had to Fig. 6 which shows in cross-section the machine of Fig. 1 as seen along the lines 6—6. As shown, the original insurance policies are folded in accordion fashion to form a stack 600 disposed in suitable guides 601 in the bottom of lower casing 100. Each policy 602 is preferably detachably secured as by a serrated line, for example, to an adjacent policy so that one policy will be pulled along by the other and the stack will unfold as indicated. Each policy 602, which comprises a printed form of dimensions adapting it to fit within the guides 601 is provided with a carbon backing 603 along a portion of its upper end. In distinction to the usual systems, the duplicating paper or duplicate policies are not folded in with the originals but are made up of a roll of duplicate paper 604 from a separate reel 605 and fed with and under the original policies up past rollers 606 and 607, and underneath the printing and marking mechanism designated generally by the numeral 610. After passing the printing and marking mechanism, the original and duplicate policies are separated, the originals being pulled forwardly by means of a sprocket chain drive 611, and the duplicates passing downwardly to a take up reel 612 which winds up the duplicate paper before such paper reaches the sprocket drive. However, both the original and duplicate paper are fed under the printing and marking mechanism 610 as shown.

Figure 2:
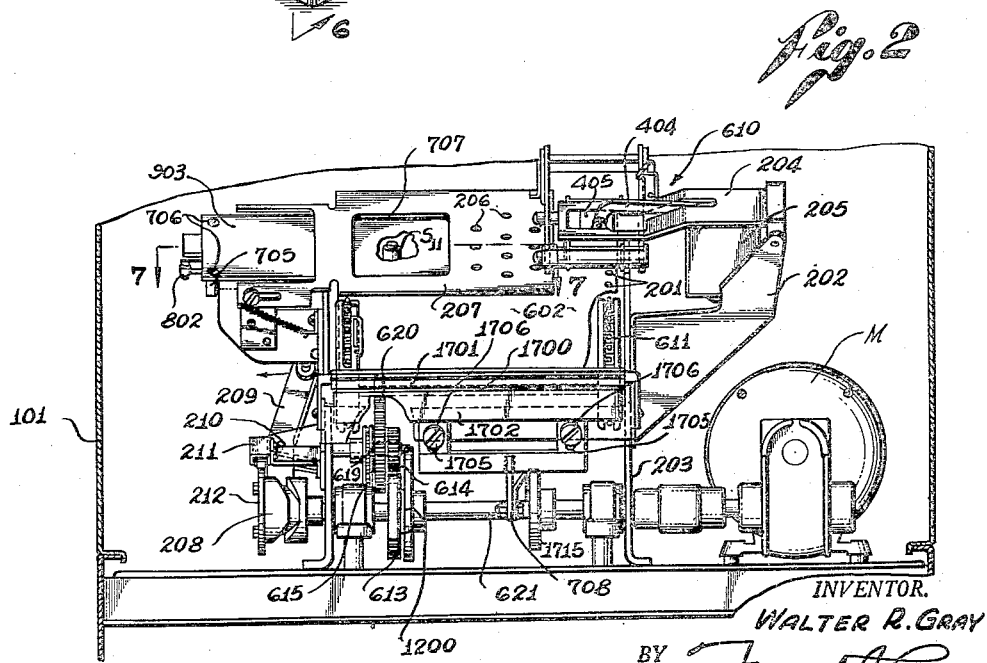
Fig. 2 is a front view of some of the interior mechanism.

Referring to Fig. 2, the relative positions of the sprocket chain drive 611 and the printing and marking mechanism 610 are shown as seen looking at the front of the machine, an original policy 602 including sprocket holes 201 along its edges, being fed towards the front by sprocket chain 611. As shown in Fig. 2, the printing mechanism is supported by a bracket 202 secured to a frame member 203 and includes a slotted plate 204 supporting a time clock apparatus 205.

Figure 4:
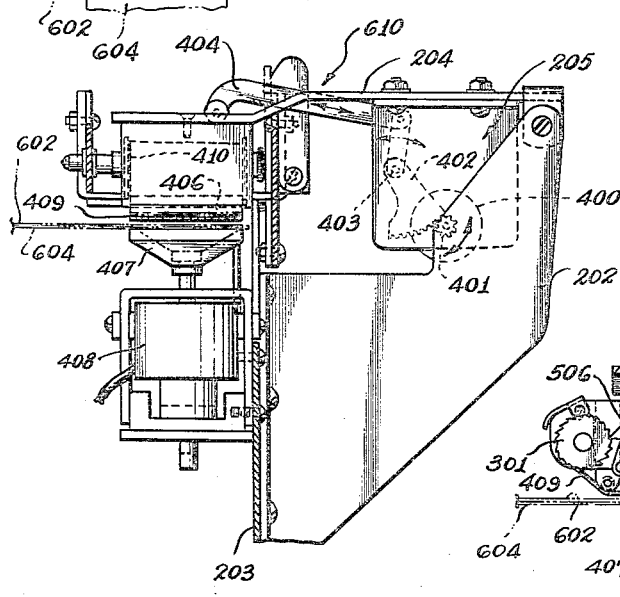
Fig. 4 is a front view of the apparatus shown in Fig. 3 looking in the direction of the arrow 4.

As best seen in Fig. 4, the time clock apparatus 205 includes an electric clock motor 400 which is continuously operated 24 hours a day, coupled to oscillate a gear 401 back and forth as indicated by the arrows. A rocker gear 402 meshes with gear 401 and is pivoted at 403 thus reciprocating a rocker arm 404 as also indicated by arrows. Rocker arm 404 moves within the slot in plate 204 and is attached to an actuating slide 405 which serves to rotate by suitable ratchet means (not shown) printing wheels 406 which will thus be continuously changed to indicate the time in hours and minutes, day, month, and year.

It will be seen that the right hand part of the policy 602 and the duplicating paper 604 pass under the printing wheels 406 but ride on top of a platen 407 arranged to be moved upwardly to the dotted line position by a solenoid 408 upon receipt of the first inserted coin. An inked ribbon 409 wound on a roller 410 passes between the policy 602 and the printing wheels.

Figure 3:
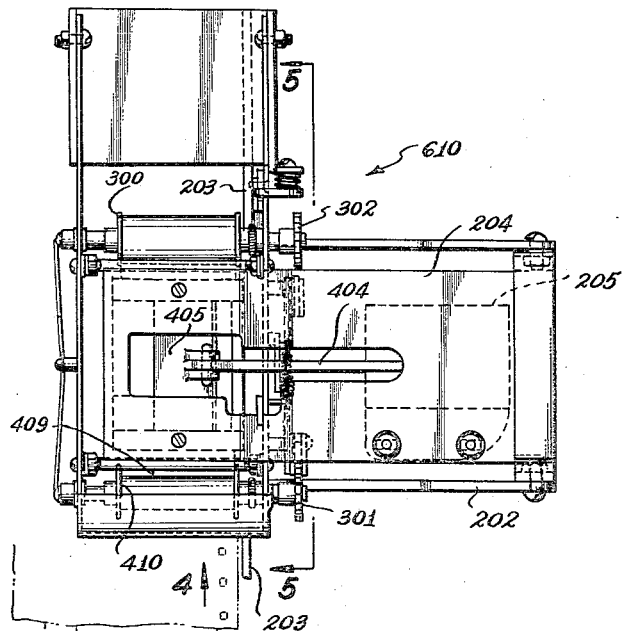
Fig. 3 is a detailed plan view of the printing mechanism.

As shown more clearly in the top view in Fig. 3, ribbon roller 410 receives inked ribbon 409 from a similar ribbon roller 300. The shafts of rollers 410 and 300 are driven by ratchet gears 301 and 302 respectively.

Figure 5:
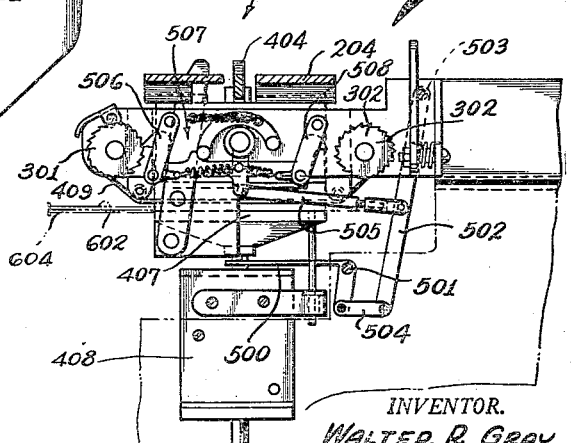
Fig. 5 is a side view of the apparatus shown in Fig. 3 looking in the direction of the arrows 5—5.

Fig. 5 illustrates the driving mechanism for these ratchet gears as seen looking along the line 5—5 of Fig. 3. As shown in Fig. 5, movement of platen 407 downwardly after it has effected printing of the date and time on the policy 602, actuates a crank arm 500 pivoted at 501. This action swings lever arm 502 pivoted at 503 to the right by means of the link 504 which motion in turn is communicated to an actuating arm 505. Arm 505 is linked to a pawl 506 engaging ratchet gear 301 to effect a movement of the gear through any suitable mechanism indicated generally by the numeral 507. When the ribbon 409 is completely wound on one roller, pawl 506 will not be able to rotate the ratchet gear 301 further and its engaging point will act as a pivot to shift mechanism 507 to the right and cause engagement of a second pawl 508 with ratchet gear 302 to reverse the direction of ribbon travel.

The printing mechanism will thus stamp by action of the platen 407 the time in hours and minutes, the clock being a 24 hour clock, date, month and year the policy is being issued. These designations are all represented by numbers and form part of the serial number of the policy. Also included adjacent the printing wheels are the agency number and the machine number which are caused to be printed on the policy when the plate 407 is moved upwardly and form a part of the serial number. A duplicate paper 604 receives similar printing treatment due to the carbon backing 603 on the policy 602.

Since the serial number is continuously changed due to the continuous change in the time indications, no two policies can possibly receive the same number. Furthermore, the duplicate copies will include exactly the identical data as appears on the original. A designation of the time and date numbers printed on the policy may be provided in the form of permanent arrows or brackets on the original policy to indicate to the customer that part of the serial number representing the date and time he purchased the policy. This printing mechanism will only be activated when the first coin of any one purchase is inserted. Subsequent coins inserted for any one purchase will not affect the printing mechanism. However, they will operate the marking mechanism which will now be described.

Referring again to Fig. 2, the marking mechanism is provided for indicating on the original and duplicate policies the number of coins inserted and thus the amount of the policy. This is accomplished by a series of solenoid operated perforators which, when actuated, project up through the duplicate paper and original policy through holes 206 in the cover plate 207 forming a part of the window cover mechanism. As shown best in Figs. 7 and 8 there are provided ten such openings 206 and ten corresponding solenoid operated perforators 800.

These perforators are arranged to be successively operated as coins are inserted whereby the number of perforations indicate the number of coins deposited. Since the perforation is effected from the bottom, the duplicate paper is first perforated and then the original is perforated. There can thus be no mistake as to the number of coins deposited. This system will foil any attempts to claim larger insurance coverage by adding perforations to the original policy after it has issued from the machine.

Moreover, perforating the policies in this manner, will permit auditing of the policies, to determine their amount, to be accomplished electronically; for example, such as by sweeping the perforations with an electric eye. The panel lights 103 (Fig. 1) are respectively connected across the solenoid perforators 800 so that they will visually indicate to the customer the number of coins deposited.

*Duplicating mechanism*

An important feature of the invention resides in the duplicating mechanism. As already explained in connection with Fig. 6, a duplicate record of the policies issued is retained on duplicate paper 604 fed from a reel 605 through the printing and marking mechanism 610 to a pickup reel 612.

Referring to Fig. 6, the drive means for moving the duplicate paper is derived from a main gear 613 meshing with gear 614 which includes a positive chain drive belt 615 driving a roller 616 spring biased against a second roller 617. As shown, the duplicate paper 604 is fed down between the rollers 616 and 617 onto the takeup reel 612. Utilizing the rollers 616 and 617 to pull the duplicate paper along insures that its motion will be uniform and not depend on how much of it is wound on the takeup reel. A spring belt 618 driven from roller 617 frictionally drives the takeup reel 612.

It will be noted that the chain sprocket drive 611 is also actuated by the main gear 613 through gear 619 coupled to gear 614 and gear 620. As shown, the motion of gear 620 is greater than that of gear 614 and thus roller 616 due to the large step-up gear 619. The arrangement is such that for every eleven inches of movement of the original policy paper 602 only three and one-fourth inches of duplicate paper will be moved, this three and one-fourth inches being all that is required to retain a record of the printing and marking mechanism and the data filled in by the customer. The duplicate paper is also only seven inches in width and thus maximum use of the available duplicate paper is employed.

It is to be emphasized that this duplicating mechanism is an important feature of the invention. Heretofore, the duplicate was disposed beneath the original and both were pulled along by sprocket drive means, the duplicate being separated at the mouth of the delivery mechanism.

In the present case the duplicate paper is in the form of one continuous roll and is always separate from the policy except when the printing and marking mechanism is operated and when the data is being filled in by the customer. Accordingly the possibility of the duplicate paper adhering or otherwise becoming stuck to the original, resulting in paper jamming, is minimized.

Furthermore, because of the fact that all the available space on the duplicate is utilized, much less than half the ordinary amount of paper is required. Accordingly in mailing the duplicates back to the home office a considerable savings in postage alone is realizable.

During motion of the driving means, the original policy paper 602, being pulled faster than the duplicate paper 604, will simply slide over the duplicate paper. Main gear 613, which drives through gears 614 and 619 respectively, the duplicate paper roller and sprocket chain drive, is mounted on a main drive shaft 621.

*Window cover mechanism*

Referring again to Fig. 2, the main shaft 621 is driven by a motor M through suitable reduction gearing. This motor M is automatically controlled to operate only during certain periods in the obtaining of the policy by suitable microswitches. When the first coin is inserted in the coin slot, a switch is actuated which starts the motor M and turns shaft 621 approximately 90 degrees. The main driving gear 613 is coupled to gear 614 in a novel manner to be presently described whereby gear 614 is not turned during this period. Thus during this first 90 degree rotation of the shaft 621 neither the sprocket chain drive nor the duplicate paper drive roller are operated. However, a box cam 208 on the end of shaft 621 is turned and serves to cam the lower end of an actuating lever arm 209 to the right. Arm 209 is pivoted at 210 whereby its upper end will be moved to the left as indicated by the arrow. This action is coupled to a window cover mechanism for uncovering the window 104 (Fig. 1) and exposing a portion of the original policy to permit the customer to fill in his name and address, etc. Insertion of the first coin also operates the printing mechanism and the first solenoid operated perforator as described above.

Referring again to Fig. 6, lever arm 209 is shown extending upwardly to the left from shaft 621 the pivot point 210 being clearly shown. This arm is coupled by a pin-in-slot arrangement to a driving member 622.

The operation of the window cover mechanism can best be understood by referring to Figs. 7 to 11 wherein the arm driving member 622 coupled to arm 209 is shown in Fig. 9 as secured to a first slide member 900. As shown in plan view in Fig. 7, a gear wheel 700 is rotatably mounted on slide 900 and meshes with a stationary gear rack 701 mounted on a stationary member 702, and also meshes with a movable gear rack 703 mounted on a movable slide 704. Referring again to Fig. 9, the stationary member 702 is secured to a main frame member 901 by screws 902. The relative positions of the gear 700, slide 900, stationary member 702 and its associated gear rack 701, and the movable slide 704 and its associated rack 703, are all clearly shown in Fig. 10.

In Fig. 7, it will be noted that the movable slide 704 terminates at its left end in a transverse bar 705 which is secured by screws 706 to a window cover plate slidably supported under main cover plate 207. This window cover plate is designated 903 in Fig. 9 and, as shown, is slidably supported in channels formed by angle flanges 904 welded to main cover plate 207. Window cover plate 903 is adapted to slide under plate 207 to close a window opening 707 in plate 207 as shown in Fig. 7.

Fig. 11 shows a view of the various gear racks and slide members as seen looking from the bottom of Fig. 7.

In operation, movement of the driving member 622 (Fig. 8) to the left by action of the lever arm 209, will move the slide 900 (Fig. 7) to the left as indicated by the arrow. This action causes gear wheel 700 to turn due to its mesh with stationary gear rack 701, which turning movement is communicated to movable gear rack 703 causing the movable slide 704 and associated transverse bar 705 to move to the left to the position indicated by the phantom lines. The transverse bar 705 being secured to window cover plate 903 (Fig. 9) slides this plate from under the window opening 707 in main cover plate 207 thus exposing a portion of the insurance policy thereunder. This described gear arrangement permits the motion of driving member 622 to be multiplied by two. The movement of driving arm 622 is stopped by a projecting flange 801 adapted to engage a microswitch 802 to stop the motor after the drive shaft 621 has completed a quarter turn.

Referring again to Figs. 1 and 2, it will be seen that with the window cover mechanism moved to the left, the upper portion of the original policy 602 will be exposed through window 707 (Fig. 2) and through the window 104 in the upper casing 101 (Fig. 1). At this stage of the operation, the customer may fill in the required information in accordance with permanent instructions provided on a plate also exposed through window 106. Transverse bar 105 makes it difficult for the customer to tamper with a policy or remove it through the window. The various window openings are of just sufficient size to accommodate the necessary information, the remaining portion of the policy being covered.

At this stage of operation, it is still possible to insert additional coins but such additional coins will not affect the printing mechanism or the motor M. They will only actuate the solenoid operated perforators as described above.

In Fig. 2, an additional safety switch $S_{11}$ is shown through the broken-away section in the window 707. This switch is pressure operated, whereby filling in of the policy by the customer will depress a backing plate to close switch $S_{11}$. The closing of this switch renders the control button C operable. Until the customer has filled in the information, $S_{11}$ remains open. Therefore, accidental pressing of the control button C will have no effect and it will not be possible for the customer to receive the policy until at least some writing or pressure has been effected on the application portion exposed through window 707. This feature prevents the customer from delivering the policy to himself and then filling it in, which action of course results in a void policy because no duplicate information is available.

It is also possible to combine switch $S_{11}$ with microswitch 802 whereby $S_{11}$ will be closed to render the C button operable only after the window cover mechanism is opened. In this case, however, the feature of a pressure operated switch to insure the filling-in of the policy is not had.

There may also be included a light which is turned on to illuminate the fill-in instructions when the window cover mechanism is opened, and turned off when the window cover mechanism is closed. Such a light, for example, may be connected into the switch circuit for switch 802 and operated thereby.

After the information has been filled in by the customer (closing switch $S_{11}$) which information has also been reproduced on the duplicate paper, and after the desired number of coins have been deposited, the control button C is depressed and this serves to close the circuit to the motor M (Fig. 2) causing rotation of main drive shaft 621 and box 208. As shown in Fig. 2, the initial rotation of shaft 621 also closes a microswitch 211 by virtue of cam 212 on the extreme left end of shaft 621. Closing of microswitch 211 maintains a circuit across the motor M and starts a reset circuit as will be described subsequently. Thus release of control button C will not now de-energize the motor. Further rotation of shaft 621 and cam 208 swings the lower end of lever arm 209 to the left which causes driving member 622 (Fig. 8) to move to the right due to the pivoting of member 209, and close the window cover mechanism through a reverse of the movement of the gear rack and slide as described above. Microswitch 802 is thus released.

At this time the main gear 613 engages the gear 614 (Figs. 2 and 6) to drive the sprocket chain drive 611 and pull the policy 602 forward. This driving unit will now be described in detail.

Sprocket drive mechanism

Referring to Figs. 12, 13 and 14, there are shown enlarged front views of the main gear 613 and gear 614, the latter gear driving both the sprocket chain drive 611 through gear 620 and the roller 616 for moving the duplicate paper as shown in Fig. 6.

It will be appreciated that the sprocket drive and the duplicate drive are only operated during certain stages in the obtaining of the policy. In order to avoid sudden jerking and possible tearing of the policy due to quick starts and stops of the driving means, the gear 613 is designed to mesh with gear 614 only after gear 614 has been accelerated up to the proper meshing speed. Similarly, after gear 613 is out of mesh with gear 614 the latter gear is gradually decelerated.

It is to be noted that the times during which gear 613 is turning but will not turn gear 614 is only when the window cover slide mechanism is being opened or closed.

The accelerated, decelerated, and intermediate operation of gear 614 by gear 613 is accomplished as follows.

Referring to Fig. 12, the gear 613 is provided with gear teeth on only 90 degrees of its circumference. Placed coaxial with but in back of gear 613 is a cam wheel 1200 having a cut-out portion 1201 for about 90 degrees of its periphery. This cut-out portion registers approximately with the 90 degrees of gear teeth on gear 613, the cam 1200 and gear 613 being secured together. At the respective peripheral ends of the cut-out portion are two radial extension plates 1202 and 1203 having arcuate bearing grooves 1204 and 1205 cut therein respectively.

Gear 614, co-planar with gear 613, is provided with two pins 1206 and 1207 on laterally opposite sides of its center and projecting from its rear in a direction normal to its plane. These pins are adapted to ride on the smooth peripheral portion 1208 of the cam 1200 as shown.

Now as main gear 613 is turned by shaft 621, the pins 1206 and 1207 will simply ride on cam surface 1208 and gear 614 will not be turned. During this time the turning of shaft 621 is utilized to actuate the window cover mechanism to close it. However, when the gear 613 rotates far enough the bearing groove 1204 in plate 1202 will encounter pin 1206 and accelerate it gradually downwardly through the camming action of the pin riding in groove 1204. This action starts gear 614 rotating and with pin 1206 at its lowermost position as shown in Fig. 13 the teeth of gear 613 will mesh with the teeth of 614 as shown. Thus the gear 614 through this action has been started up gradually and attained the proper speed by the time the respective gear teeth are ready to mesh.

The gear 613 continues to rotate, the gear 614 now turning at uniform speed as shown in Fig. 14 by the arrow and serving to drive the sprocket chain drive and duplicate paper roller as already described.

When gear 613 has turned gear 614 through three-quarters of a turn, the second bearing groove 1205 in plate 1203 encounters pin 1207 which would now be in its lowermost position and pin 1207 riding up in the groove 1205 will gradually decelerate the gear 614. The two pins 1206 and 1207 will then be horizontal and ride on the cam surface 1208 of the cam 1200 as shown in Fig. 12.

With the above arrangement, it will be seen that the sprocket driving means is started and stopped gradually. Referring again to Fig. 6, the gear 614 is shown as being coaxial with and secured to a larger gear 619 which drives gear 620 to actuate the sprocket drive chain 611.

Referring now to Fig. 15, the sprocket drive chain, designated generally by the numeral 611, comprises a series of double links 1500, each pair of links being pivoted on a corresponding pin 1501. As best shown in Fig. 16, a center journal bearing 1600 is mounted on the pin 1501 and defines with the links 1500 making up the referred to pair, a pair of slots into which a pair of sprocket support legs 1601 loosely fit. As shown, each leg 1601 includes a bore larger than necessary to accommodate pin 1501 whereby the legs 1601 are capable of some free movement.

Legs 1601 depend from a sprocket support plate 1602. Plate 1602 mounts sprocket 1603 and is adapted to slide loosely within channels 1604 defined by guide members 1605. A slotted cover plate 1606 is secured to the members 1605 and is provided with an elongated slot within which sprocket 1603 may move. The members 1605 and 1606 are stationary while the chain made up of the links 1500, pin 1501 and journal bearing 1600 carry the sprocket support and sprocket.

Referring again to Fig. 15, the normal distance between respective sprockets, each sprocket being mounted as described above, is designated by X. Because of the loose fit of the sprocket support legs on the pin 1501 and the loose fit of the plate 1602 in the channels 1604, the sprocket is in effect "floating" and it may move or wobble in any direction a small distance "$a$." Thus, as indicated in the lower drawing of the sprocket drive means, the distance between any two sprockets could be increased to a value of $x$ plus $2a$. So mounting the sprockets 1603 in this manner, permit them to accommodate themselves to the corresponding sprocket holes along the edges of the insurance policy paper in the event the paper should shrink due to climatic conditions or be improperly perforated in the manufacture thereof. It is to be noted that the sprocket 1603 has transverse leeway as well as leeway in the longitudinal direction so that transverse shrinkage or incorrect spacing in the width dimension of the policy paper will also be accommodated.

This floating sprocket arrangement is an important feature of the invention as it lessons considerably the possibility of the apparatus becoming jammed due to shrinkage of, or improper perforation spacing in the policy paper.

As seen best in Fig. 6, the sprocket chain drive 611 is of such length that several sprockets, eight for example, are pulling on each side of the policy simultaneously. This means that even though some sprocket holes in the policy may be damaged it will still be properly fed by the chain drive. This is a considerable improvement over a sprocket wheel wherein only one or at the most two sprockets would be operatively engaging the respective sprocket holes at the edges of the policy at one time. Moreover, with the long chain drive employed the pulling force is distributed among several sprocket holes and thus the chances of damaging such sprocket holes is lessened. It is to be recalled that in distinction to prior machines, in the present machine no duplicates are pulled by the sprocket drive, but only the original policies.

Delivery mechanism

As illustrated in Fig. 6, the chain sprocket drive will feed the policy 602 through a delivery mechanism designated generally by the numeral 623 after the customer has depressed the control button C (Fig. 1).

Referring to Fig. 17, this delivery mechanism is shown in detail as seen looking from the opposite side of that shown in Fig. 6. In Fig. 17 the policy is fed through a slit 1700 defined by upper and lower jaws 1701 and 1702 respectively. Upper jaw 1701 preferably includes a strip of rubber padding material 1703 fixed to its lower surface. Lower jaw 1702 is secured to a slide plate 1704 including two vertical slots 1705 (Fig. 2) through which bolts 1706 pass and is secured to a stationary frame plate 1707. Slide plate 1704 (Fig. 17) is thus permitted to slide upwardly against frame plate 1707 the bolts 1706 being accommodated by the elongated slots 1705 which limit the upward movement of slide plate 1704 when the lower end of the slots abut the bolts 1706. The upward movement of the lower jaw 1702 closes slit 1700 and results in the policy 602 being gripped between the jaws.

This action, however, only obtains after the completed policy has been fed by the sprocket chain drive through the jaws and down into the depressed area 107 (Fig. 1), at which time the gripping of the next following policy by the jaws permits the customer to tear off or otherwise detach the completed policy.

The mechanism for actuating the lower jaw will now be described. As shown in Fig. 17, slide plate 1704 is secured to an arm 1708 pivoted at 1709 to a lever arm 1710. Lever arm 1710, pivoted at 1711 to the frame 1712, is provided with a cam pin 1713 which rides in a cam slot 1714 in box cam wheel 1715 secured to the main shaft 621.

Rotation of shaft 621 will not affect the lower jaw until the raised portion 1716 of the cam slot 1714 engages and thus raises pin 1713 which motion is communicated through lever arm 1710 to the lower jaw 1702. When the pin 1713 is at its highest point in the raised portion 1716 of cam slot 1714, rotation of shaft 621 is stopped by a microswitch which opens the circuit to the motor M.

Referring again to Fig. 2, this opening of the motor circuit after the jaws 1701 and 1702 are closed is accomplished by the cam wheel 212 on the extreme left end of main shaft 621 which opens a microswitch 211. The completed policy 602 is now left hanging in the depressed area 107 where the customer may conveniently retrieve it.

As stated earlier, the several insurance policies are attached together by a serrated line whereby one policy will pull another. Because of this serrated line, it is easy for the customer to detach the completed policy from the next adjacent policy, since the end of the latter policy is gripped in the jaws of the delivery mechanism.

Should the customer desired to purchase additional policies, he need simply repeat the procedure of obtaining the same and the next policy will be delivered and hang from the depressed area 107 while still attached to the first policy. Thus the various policies will all hang together unless purposely separated by the customer.

It is an important feature of the invention that the policies are not cut or severed by a cutting knife. If they were so treated, the policies would fall to the floor or if a receptacle were provided, such receptacle could possibly get overloaded and prevent further policies from issuing from the jaws of the delivery mechanism, in the event one customer were purchasing several policies successively.

It is also to be noted that pre-serrated policies need not be provided but merely a continuous stack of paper with the printed forms appearing thereon. In this event a serrating knife could be installed on lower jaw 1702 and suitable mating sockets provided on a member to replace the rubber strip 1703 on the upper jaw 1701. This serrating knife would not completely sever the policy but merely serrate it so that a customer could conveniently detach the policy as described.

*Electrical circuit*

The overall operation as well as some additional features will now be reviewed and further described with reference to Fig. 18 which shows in schematic form the electrical circuit for the complete machine.

Referring to Fig. 18, two power terminals 1800 and 1801 at the upper lefthand corner of the drawing are adapted to be connected to any suitable A.-C. voltage supply. The terminal 1800 connects to a lefthand conductor 1803 which constitutes one side of the power circuit, and the terminal 1801 connects to a righthand conductor 1804 which constitutes the other side of the power circuit. As shown, the timing clock 400, which is operated 24 hours a day and which has already been described in Fig. 4 as coupled to the printing mechanism 405, is connected directly across the power input line. This timing clock is also designated D-T (date-time).

Also connected across the power line are two paper monitors 1805, 1806, and an out-of-order light 1807 as shown. Referring to Fig. 6, the paper monitor 1805 is shown in the extreme lower lefthand corner adjacent the stack 600 of original policies. This monitor and its associated switch S1 are actuated when the policy stack 600 becomes depleted. The depletion of the policy stack opens switch S1 and closes the gap at 1805 shown in Fig. 18 thereby connecting lamp 1807 across the circuit to indicate the machine is out of order. Similarly, the paper monitor 1806 is shown in Fig. 6 as monitoring the duplicate roll whereby depletion of this roll will open switch S2 (Fig. 18) and close the gap at 1806 to light lamp 1807.

In Fig. 18, there is also shown a magnet coil 1808 one terminal of which is connected through a normally closed switch S3 to the left line 1803, and the other terminal which connects through a conductor 1809 to the right line 1804. This magnetic coil 1808 controls a trap in the coin box forming part of a slug rejector unit whereby de-energization of the coil permits the trap to open and inserted coins to be returned to the coin return 108 (Fig. 1). Thus the opening of either switch S1 or S2 due to exhaustion of either or both the original and duplicate policies will de-energize coil 1808 and cause further inserted coins to be returned to the customer. Also opening of these switches will turn off all the panel lights illuminating the instructions in windows 110 and the application window, and cause the out-of-order light 1807 located behind and visible through the coin slot opening 102, to turn on.

With the machine properly supplied with original and duplicate policies, switches S1 and S2 will be normally closed. Now insertion of a first coin in the coin slot 102 (center of Fig. 18) will cause a coin operated switch S4 to close momentarily. The brief period during which switch S4 is closed, is sufficient to actuate a coin counter 1810 which is connected across the power circuit through the switch S4 as shown. Coin counter 1810 will register a count each time switch S4 closes and thus register the number of coins inserted.

During the brief period switch S4 is closed, a relay 1811 connected between the power leads 1804 and 1803 through switch S4 and a branch conductor 1812, is energized and closes switches S5 and S6. Closing switch S6 connects a first terminal T1 of a rectifier R to line 1804 through conductors 1813, 1814, S6, 1812 and S4. A second rectifier terminal T2 is permanently connected to line 1803. Thus A.-C. current from the power lines is connected across the rectifier R and converted to D.-C. at the terminals T3 and T4. T3 is connected directly to terminal T5 of a rotary type solenoid master switch 1815, while T4 is connected with the other terminal T6 of the master switch through conductor 1816 and the switch S5, which is closed at the same time S6 is closed by relay 1811.

Actuation of master switch 1815 actuates a slave switch 1817 as indicated by the dotted line 1818. Slave switch 1817 is thus stepped to position 1 as shown and a circuit is completed from left power line conductor 1803 through a normally closed switch S7, conductor 1819, switch 1817 in number 1 position, conductor 1820, solenoid operated perforater 800 and indicator lamp 103, to right power line 1804. The first solenoid operated perforator 800 is thus operated and perforates the duplicate and original policies indicating that one coin has been inserted. Indicator lamp 103 also lights up indicating to the customer that one coin has been inserted.

Also leading from the number 1 position of slave switch 1817 is a circuit comprising in parallel solenoid 408 and a paper counter 1821. Connected to these elements is one terminal of relay 1822, the other terminal of which connects through a conductor 1823, normally closed microswitch 802, and conductor 1824 to line conductor 1804. Thus in addition to the operation of the first solenoid perforator 800 and lamp 103 paper counter 1821 is caused to register and accordingly count the policies issued. Also operated is the solenoid 408 which operates the printing mechanism for printing the date and time on the policy as shown and described in connection with Fig. 4.

Relay 1822 is also energized and operates to close switches S9 and S10. Closing of switch S9 connects right power line 1804 through conductor 1824, switch 802, conductor 1823, switch S9 and conductor 1825 to one terminal of motor M, the other terminal connecting to left line 1803 through conductor 1826.

The motor M is accordingly energized and it will rotate shaft 621 (Fig. 2) to cause opening of the window cover mechanism. As already mentioned, when the window cover is opened, a micro switch 802 (Fig. 8) is opened which opens the circuit to motor M. This switch is also designated 802 in Fig. 18 and it is seen that opening of switch 802 opens the line between conductors 1824 and 1823 thus opening the electrical circuit to motor M.

With the window cover mechanism open, the customer now fills in the policy and at this time may insert any number of additional coins up to ten depending on the amount of insurance desired. Filling in the policy actuates the normally open safety switch S11 to close this switch. The action of the circuit upon insertion of subsequent coins is as follows.

A second coin inserted in coin slot 102 will actuate coin operated switch S4 operating the coin counter 1810 and closing the circuit across relay R through switches S5 and S6 which are closed by relay 1811. Master switch 1815 then steps slave switch 1817 to the number 2 position to connect a second solenoid operated perforator 800 and lamp 103 from powerline 1804 to powerline 1803 through a conductor 1827, number 2 position of switch 1817, conductor 1819, and normally closed switch S7. A second perforation indicating that two coins have been deposited is thus effected and the second indicator lamp 103 is turned on.

It is to be noted that when the arm of switch 1817 leaves the number 1 position the circuit to the first solenoid and lamp 103 is broken causing the first light 103 to be extinguished. Also broken is the circuit to the paper counter 1821, the printing mechanism solenoid 408 and the relay 1822 thereby causing switches S9 and S10 to open. The circuit to the motor M is thus opened. Therefore, insertion of the second coin will not actuate the paper counter, printing mechanism, or the window cover mechanism. Similarly, insertion of the third, fourth, fifth, etc., all the way up to the ninth coin inclusive will not actuate these mechanisms but will only operate the solenoid perforators 800 and associated indicating lamps 103 through the action of switch S4 and the master and slave step switches.

Upon insertion of the tenth coin, however, a circuit through a relay coil 1827' is completed by conductor 1809 connected to righthand power line 1804, and conductor 1828 through position 10 and the arm of switch 1817, conductor 1819, normally closed switch S7 to the lefthand power line 1803. Relay 1827 when energized opens switch S3 de-energizing electromagnet 1808 which results in further inserted coins being returned to the coin return box as described in connection with the paper monitors.

After the customer has inserted the desired number of coins and has filled in the required information on the original policy through the window so as to close S11, the control button C is depressed.

Closing of control button C which is in series with the safety switch S11 closes the motor circuit through conductor 1824, S11, C, M, and 1826. The provision of the normally opened safety switch S11, renders control button switch C inoperative at all times until after the window cover mechanism is opened and the policy filled in. Thus accidental pressing of this button at the improper stage in obtaining the policy will have no effect.

With button switch C closed, the motor M will rotate shaft 621 and slide the window cover mechanism to closed position. The moment the window cover mechanism begins to close the cam operated switch 211 is closed and microswitch 802 (Fig. 8) is released from its held open position to resume its closed position. Also the safety switch S11 is opened. The motor M will keep running by virtue of the microswitch 211 which is closed by the action of the cam 212 on shaft 621 during initial rotation when button C is depressed (Fig. 2). The circuit to the motor is now from righthand power line 1804 through conductor 1829, switch 211, conductor 1830, motor M, and conductor 1826 to lefthand power line 1803.

Motor M will keep turning shaft 621 until the window cover mechanism is completely closed at which time the gears 613 and 614 operatively engage to operate the chain sprocket drive which feeds the original policy through the jaws of the delivery mechanism. As explained in connection with this delivery mechanism, when the jaws are closed to grip the end of the next adjacent policy, the completed policy is hanging in the depressed area 107 and the cam 212 on the extreme left end of the shaft 621 (Fig. 2) is in position at this time to open microswitch 211. During the delivering of the policy when switch 211 is held closed by cam 212, however, a circuit from right power line 1804 through conductor 1829, switch 211, a conductor 1831, a conductor 1832, reset relay coil 1833, and a conductor 1834 to lefthand power line 1803 is completed thereby energizing reset relay coil 1833 to close normally open switches S13 and S14. A circuit is also closed to left power line 1803 through a conductor 1835 connected to conductors 1832 and 1831 and passing through relay coil 1836 to power line 1803. Energization of coil 1836 opens normally closed switch S7 which opens the circuit through conductor 1819 to slave switch 1817 and thus disconnects the circuit to the solenoid operated perforators.

Energization of relay 1833 to close switch S14 completes a circuit to terminal T1 of the rectifier R from righthand power line 1804, through conductor 1829, switch 211, 1831, 1832, S14, conductor 1837, and conductor 1813. Terminal T2 is already connected to lefthand power line 1803. An A.-C. current is thus placed across rectifier R which is converted to D.-C. and fed to master switch 1815 by the connection of terminal T3 to T5 and the connection of T4 to T6 through conductor 1816, switch S13 which is now closed by relay 1833, and conductor 1838. This D.-C. current will step the master switch 1815 around to its initial position at which point it will cut itself off and will not be further stepped until the D.-C. circuit thereto is broken and then reconnected. Stepping of master switch 1815 will step the slave switch 1817 to zero position but as the slave switch is being stepped, the solenoid perforators 800 will not be actuated by virtue of the fact that switch S7 is being held open by relay 1836 during this time.

It is to be noted that this resetting operation is accomplished relatively quickly and is completed long before the shaft 621 has rotated sufficiently to effect opening of switch 211 by cam 212. As already stated, when 211 is opened the motor is stopped and the circuit to the resetting relay 1833 and relay 1836 is opened thus de-energizing these relays and permitting switch S7 to resume its normally closed position and switches S13 and S14 to resume their normally opened positions. The machine is in position now to issue another policy, upon insertion of coins in the coin slot 102. The completed policy hanging from the next policy which is gripped in the jaws of the delivery mechanism, may now be conveniently detached by the customer.

For convenience in servicing the machine, an internal control switch S15 connected between motor M and righthand line 1804 may be provided to permit a service man to operate the motor without having to deposit coins. This switch is normally open and cannot be operated from the outside of the machine. Also there is provided an interlocking switch L in series with switch 211 which is normally closed, but is opened when the back paneling of the machine is removed by a service man. Thus closing of the switch S11 when the service man runs the motor by closing service switch S15, will have no effect, and the motor may be stopped at any point in the operation.

It is to be noted that the entire sequence of operations is effected by just one complete rotation of the main shaft 621.

From the above description, it will be seen that a vastly improved vending machine has been provided and that the several objects of the invention have been fulfilled. Various modifications of certain features can be effected without departing from the spirit of the invention. Thus the apparatus is not to be thought of as limited to the particular embodiment and circuit shown and described.

I claim:

1. In a machine for issuing forms, a drive means for feeding said forms comprising a drive gear; a main gear co-planar with said drive gear and including gear teeth only on a portion of its periphery adapted to operatively engage said drive gear only during a portion of the rotation of the main gear; means on said main gear and said drive gear for gradually accelerating said drive gear up to the meshing speed of said main gear during the initial portion of said engagement, and for decelerating said drive gear to zero speed during the terminal portion of said engagement, said accelerating and decelerating means including a cam wheel coaxial with and coupled to said main gear and defining a cut-out portion, the peripheral ends of said cut-out portion each including a radially extending plate having an arcuate bearing groove cut therein, the gear teeth only on a portion of the main gear periphery registering with said cut-out portion on said cam wheel, and two pins projecting from said drive gear and adapted to ride on said cam wheel peripheral camming surface whereby upon rotation of said main gear, a bearing groove in one of said radially extending plates will eventually encounter one of said pins to accelerate said drive gear to meshing speed and subsequently the other bearing groove will encounter the other of said pins to decelerate said drive gear to zero speed.

2. In a coin operated form vending machine including a housing having a window past which a strip of forms is adapted to be fed within the housing, and a closure for said window operable between open and closed position, the improvements comprising: electrical drive means, said drive means occupying a normal position and said closure occupying its closed position prior to insertion of a coin into the machine, means operatively connecting said closure and drive means for movement of the closure to open position in response to initial driving of the drive means from said normal position to a first operative position, and for movement of said closure to closed position in response to driving of said drive means from said first operative position to a second operative position, said drive means being operable from said second operative position to said normal position to complete an operating cycle of the machine, feed means for said strip of forms, and drive mechanism operatively connecting said feed means and drive means for operation of said feed means to advance said strip the distance of one form length during operation of the drive means from said second operative position to said normal position.

3. The subject matter of claim 2 including energizing circuit means for said drive means, said energizing circuit means including a first energizing circuit operable to energize said drive means to cause driving of the latter from said normal position in response to insertion of a coin into the machine and switch means operated in response to driving of said drive means to said first position to open said first circuit and deenergize said drive means, said energizing circuit means comprising a second energizing circuit including switch means operable by a user of the machine to complete said second circuit for driving of said drive means from said first position, through said second position and back to said normal position.

4. The subject matter of claim 2 wherein said drive mechanism comprises a driving gear driven by said drive means, a driven gear adapted to mesh with said driving gear and drivably connected with said feed means, said driving gear being turned through one revolution during each operating cycle of the machine and having teeth about only a portion of its periphery, said driving gear being so orientated that the teeth thereon are brought into mesh with the teeth on the driven gear upon driving of the drive means to said second position and are disengaged by the teeth of the driven gear upon driving of said drive means to said normal position.

5. The subject matter of claim 2 wherein said means operatively connecting said closure and drive means comprises rotary cam means driven by said drive means, and means operatively connected to said closure and engaging said cam means for operation of said closure by rotation of said cam means.

6. The subject matter of claim 5 wherein said closure comprises a slidable door, and said means operatively connected to said closure and engaging said cam comprises a pivotal arm adapted to be rocked in one direction to open the door and in the other direction to close the door, said cam being shaped to cause rocking of said arm in said one direction during driving of the drive means from said normal position to said first position and to cause rocking of the arm in said other direction during driving of the drive means from said first position to said sceond position.

7. In a coin operated form vending machine including a housing having a window past which a strip of forms is adapted to be fed within the housing, and a closure for said window movable between open and closed positions, the improvements comprising: electrical drive means, energizing circuit means for said drive means comprising a first energizing circuit operable in response to the insertion of a coin into the machine to cause driving of said drive means from a normal inoperative position to a first operative position, means operatively connecting said closure and drive means for movement of the closure from closed to open position during driving of the drive means from said normal position to said first position, said first circuit including switch means operative to break said first circuit in response to opening of said closure by the drive means, said energizing circuit means comprising a second energizing circuit in parallel with said first circuit, said second circuit including switch means operable by a user of the machine to complete said second circuit and initiate driving of the drive means from said first position, said energizing circuit means further comprising a third energizing circuit in parallel with said first and second circuits, said third circuit comprising switch means operable by said drive means to complete said third circuit in response to driving of said drive means from said first position for driving of said drive means from said first position through a second position to said normal position, said means operatively connecting the closure and drive means being arranged to cause movement of the closure to closed position in response to driving of the drive means from said first position to said second position, means driven by said drive means for feeding said strip of forms the distance of one form length during driving of said drive means from said second position to said normal position, and said switch means in said third circuit means being opened in response to driving of the drive means to said normal position to deenergize the drive means.

8. The subject matter of claim 7 wherein said first circuit includes normally open electrical stepping switch means which are stepped from open to closed position to complete said first circuit in response to insertion of a coin in the machine, and resetting circuit means for said stepping switch means including switch means operable by said drive means during driving of the latter from said first position to normal position to cause stepping of said stepping switch means to open position prior to driving of said drive means to normal position.

9. In a form vending machine of the class described including a supply of original forms and a supply of blank duplicate paper adapted to be fed along predetermined paths through the machine, the combination comprising: electrically operated drive means; first feed means driven by said drive means adapted to feed said forms in succession along their respective path at a given speed; second feed means driven by said drive means adapted to feed said duplicate paper along its respective path at a speed less than said given speed; selectively operable means for initiating operation of said drive means to operate said feed means; circuit means for terminating operation of the drive means and conditioning said selectively operable means for subsequent initiation of operation of the drive means; and control means actuated by said drive means for operating said circuit means to stop said drive means after predetermined feeding movement of said first feed means; said drive means comprising a drive gear, a main gear coplanar with said drive gear and including gear teeth only on a portion of its periphery adapted to operatively engage said drive gear only during a portion of the rotation of the main gear, means on said main gear and said drive gear for gradually accelerating said drive gear up to the meshing speed of said main gear during the initial portion of said engagement, and for decelerating said drive gear to zero speed during the terminal portion of said engagement, said accelerating and decelerating means including a cam wheel coaxial with and coupled to said main gear and defining a cut-out portion, the peripheral ends of said cut-out portion each including a radially extending plate having an arcuate bearing groove cut therein, the gear teeth only on a portion of the main gear periphery registering with said cut-out portion on said cam wheel, and two pins projecting from said drive gear and adapted to ride on said cam wheel peripheral camming surface whereby upon rotation of said main gear, a bearing groove in one of said radially extending plates will eventually encounter one of said pins to accelerate said drive gear to meshing speed and subsequently the other bearing groove will encounter the other of said pins to decelerate said drive gear to zero speed.

10. In a form vending machine including a housing having a window past which a strip of forms is adapted to be fed within the housing, the improvements comprising: a cover plate for said window, means slideably supporting said plate on said housing for movement in opposite directions between a normal closed position wherein said plate extends across said window and an open position, means for moving said plate between said positions including first and second racks extending parallel to said directions, means mounting one of said racks on said plate, means mounting the other rack on said housing, a gear between and meshing with said racks, a slide mounted on said frame for movement in said directions and journalling said gear, and electrical drive means on said housing and connected to said slide for moving the latter and said gear in said directions to open and close said cover plate.

11. The subject matter of claim 10 wherein said drive means comprises a pivotal arm on said support, means connecting one end of said arm to said slide for movement of the latter in said directions upon rocking of said arm in opposite directions, and motor driven cam means engaging said arm for rocking the latter.

12. In a form vending machine including a housing having a window past which a strip of forms is adapted to be fed within the housing, the improvements comprising: electrical drive means for feeding said forms past said window, said window permitting users of the machine to write on said forms, a backing plate on said housing below said window over which said forms move and on which a pressure is exerted by a user writing on a form, an energizing circuit for said drive means including a first normally open, pressure operated switch engaging said backing plate and closed by writing pressure on said plate and a second normally open switch in series with said first switch and located exteriorly of the machine for actuation by a user of the machine.

References Cited in the file of this patent

UNITED STATES PATENTS

| | | |
|---|---|---|
| Re. 17,905 | Wright | Dec. 16, 1930 |
| 568,454 | Norcross | Sept. 29, 1896 |
| 959,063 | Manshel | May 24, 1910 |
| 1,114,818 | Sweet | Oct. 27, 1914 |
| 1,141,170 | Boerner | June 1, 1915 |
| 1,220,102 | Hall | Mar. 20, 1917 |
| 1,506,491 | Kline | Aug. 26, 1924 |
| 1,719,497 | Bell | July 2, 1929 |
| 2,160,916 | Sherman | June 6, 1939 |
| 2,179,156 | Mabon | Nov. 7, 1939 |
| 2,215,004 | Knox | Sept. 17, 1940 |
| 2,266,825 | Streckfuss | Dec. 23, 1941 |
| 2,271,073 | Harris | Jan. 27, 1942 |
| 2,282,561 | Callahan | May 12, 1942 |
| 2,309,656 | Metzner | Feb. 2, 1943 |
| 2,318,020 | Sherman | May 4, 1943 |
| 2,331,351 | Seeley | Oct. 12, 1943 |
| 2,345,286 | Peterson | Mar. 28, 1944 |
| 2,347,786 | McNabb | May 2, 1944 |
| 2,348,059 | Daley | May 2, 1944 |
| 2,365,544 | Geyer et al. | Dec. 19, 1944 |
| 2,411,805 | Peterson | Nov. 26, 1946 |
| 2,477,105 | Wildhaber | July 26, 1949 |
| 2,482,108 | Hageman | Sept. 20, 1949 |
| 2,498,036 | Grace | Feb. 21, 1950 |
| 2,511,041 | Bowden et al. | June 13, 1950 |
| 2,548,136 | Auer | Apr. 10, 1951 |
| 2,596,230 | Frick | May 13, 1952 |
| 2,655,372 | Hempel | Oct. 13, 1953 |
| 2,734,657 | Drese | Feb. 14, 1956 |